(12) United States Patent
Nasarczyk et al.

(10) Patent No.: US 12,345,284 B2
(45) Date of Patent: Jul. 1, 2025

(54) PET BED COMPONENT

(71) Applicant: GALE PACIFIC LIMITED, Braeside (AU)

(72) Inventors: Andrew Nasarczyk, Braeside (AU); Jeffrey Richard Turnbull, Denver, CO (US)

(73) Assignee: GALE PACIFIC LIMITED, Braeside (AU)

( * ) Notice: Subject to any disclaimer, the term of this patent is extended or adjusted under 35 U.S.C. 154(b) by 161 days.

(21) Appl. No.: 18/082,278

(22) Filed: Dec. 15, 2022

(65) Prior Publication Data

US 2023/0204060 A1 Jun. 29, 2023

(30) Foreign Application Priority Data

Dec. 24, 2021 (AU) ................................ 2021904261

(51) Int. Cl.
*F16B 12/44* (2006.01)
*A01K 1/035* (2006.01)

(52) U.S. Cl.
CPC .............. *F16B 12/44* (2013.01); *A01K 1/035* (2013.01); *F16B 2012/446* (2013.01)

(58) Field of Classification Search
CPC ....... A01K 1/035; A01K 1/0353; F16B 7/044; F16B 7/048; F16B 7/0486; F16B 12/44; F16B 12/48; F16B 2012/443; F16B 2012/446; Y10T 403/34; Y10T 403/341; Y10T 403/347; Y10T 403/44; Y10T 403/443; Y10T 403/447
USPC ................. 403/169, 170, 176, 217, 218, 219
See application file for complete search history.

(56) References Cited

U.S. PATENT DOCUMENTS

| | | | | |
|---|---|---|---|---|
| 1,820,284 A | * | 8/1931 | Mills .................... | A01K 1/0353 119/28.5 |
| 2,762,639 A | * | 9/1956 | Molter .................. | F16B 7/0446 403/164 |
| 2,839,320 A | * | 6/1958 | Hill ........................ | F16B 7/0486 403/172 |
| 3,272,582 A | * | 9/1966 | Mack ..................... | F16B 12/44 403/172 |
| 6,247,869 B1 | * | 6/2001 | Lichvar .................. | F16L 47/00 403/169 |
| 8,192,105 B2 | * | 6/2012 | Keyvanloo ............. | F16B 12/44 403/171 |

(Continued)

FOREIGN PATENT DOCUMENTS

| | | | | |
|---|---|---|---|---|
| EP | 2671468 A1 | * | 12/2013 | .............. F16B 12/44 |
| WO | WO-2017131521 A1 | * | 8/2017 | ........ F16B 2012/446 |

*Primary Examiner* — Josh Skroupa
(74) *Attorney, Agent, or Firm* — CANTOR COLBURN LLP

(57) ABSTRACT

A component connector includes a body having a first end for receiving a portion of a first component and a second end for receiving a portion of a second component, a locking member moveable relative to the connector body between a locked position and an unlocked position, wherein, in the locked position, the locking member engages with the connector and restricts movement of at least one of the first component and the second component portions relative to the connector body, and in the unlocked position the locking member at least partially disengages with the connector body, thereby allowing relative movement between the connector and at least one of the first and second component portions.

19 Claims, 8 Drawing Sheets

(56) References Cited

U.S. PATENT DOCUMENTS

| | | | |
|---|---|---|---|
| 9,638,365 B1 * | 5/2017 | Reviel | F16B 7/048 |
| 10,898,006 B2 * | 1/2021 | Squires | F16B 12/44 |

* cited by examiner

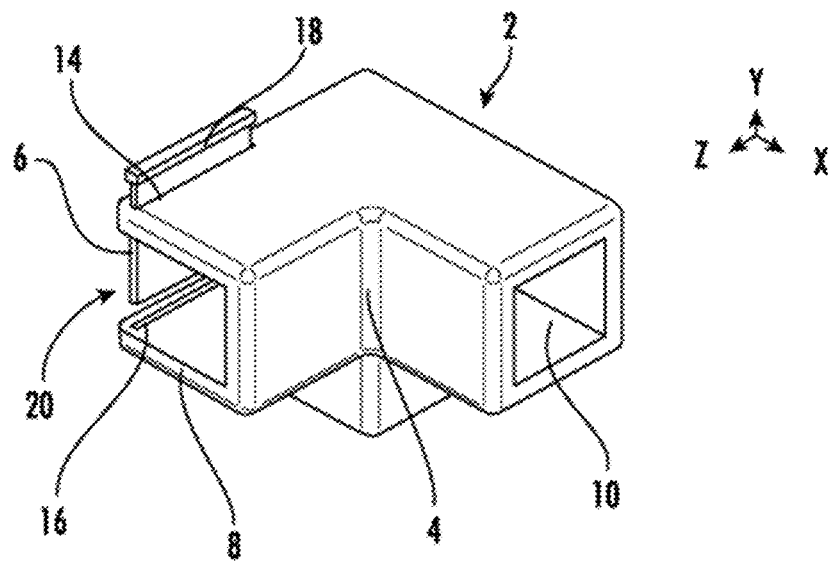
FIG. 1
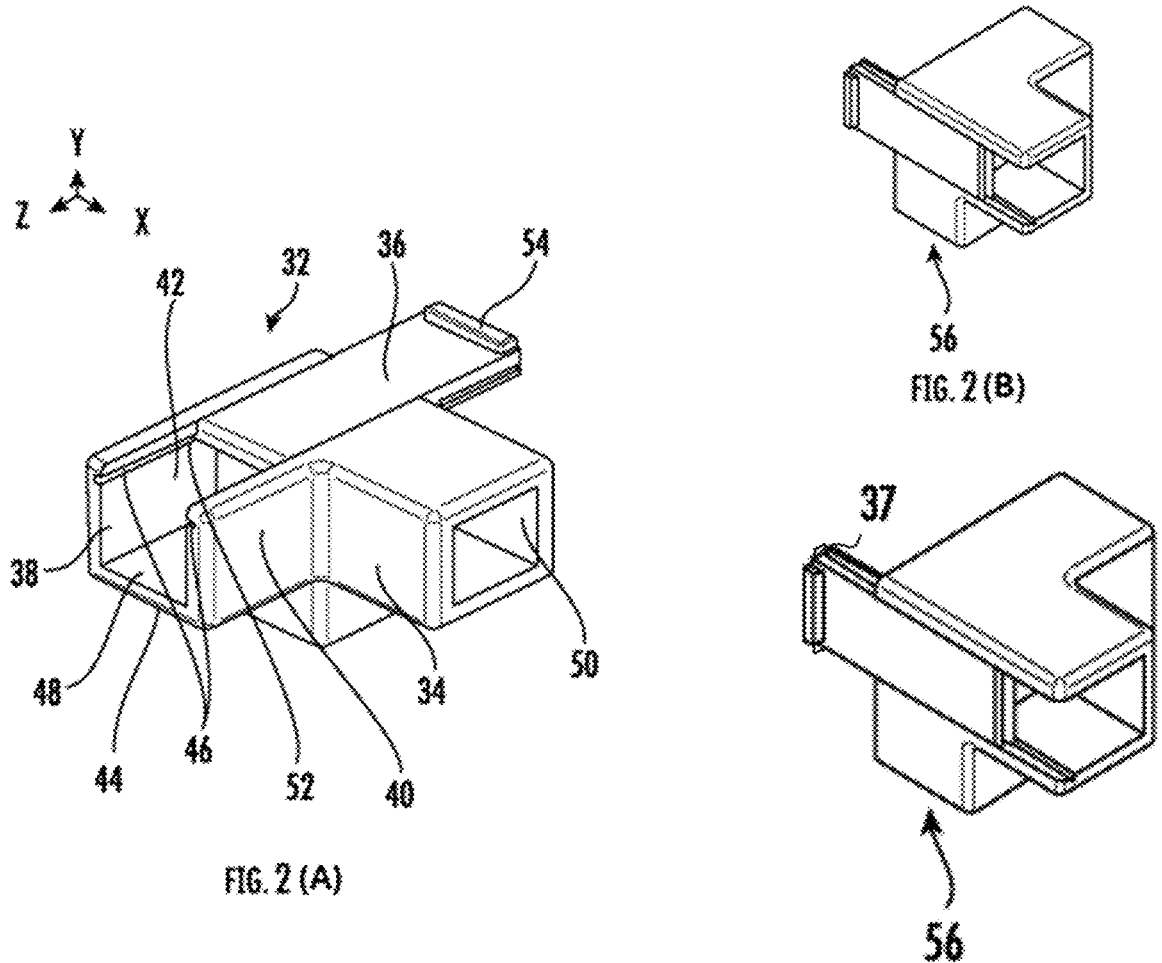
FIG. 2(A)
FIG. 2(B)
FIG. 2(C)

2, OR 32, OR 60, OR 102, OR 132, OR 172, OR 202, OR 222, OR 242, OR 262, OR 292, OR 342, OR 364, OR 402, 422

PET BED COMPONENT

CROSS REFERENCE TO RELATED APPLICATIONS

This application claims priority from Australian application 2021904261 filed on 24 Dec. 2021, the contents of which are entirely incorporated herein by this reference.

TECHNICAL FIELD

The present invention generally relates to furniture. The invention has particular application to the connection of components of furniture frames, in particular a frame for a pet bed, and a pet bed, and so will be generally described in this context. However, the invention is considered to have wider application and so could be used to form part of frames of items other than furniture, or for connecting components in a network such as piping in plumbing networks.

BACKGROUND OF INVENTION

The discussion of the background to the invention that follows is intended to facilitate an understanding of the invention. However, it should be appreciated that the discussion is not an acknowledgement or admission that any aspect of the discussion was part of the common general knowledge as at the priority date of the application.

Furniture items such as beds often include a basic structure that underlies or supports the furniture item. This structure is known as a frame. The frame is required to ensure a furniture item maintains its shape, whilst safely supporting a pre-determined amount of weight. In light of this, the structural integrity of a frame is of importance as it forms the skeleton of the item of furniture.

Frames can be formed from a plethora of materials, including wood, plastic composites, metals, alloys, synthetic polymers, or a combination thereof. Although a frame can be formed from a single piece of material, frames are more often formed by connecting a number of components.

Frame components such as cross-members, arms and legs can be connected/attached together through a wide variety of means. The point at which the components are connected are called joints. The components attached to each other at these joints can be welded, or chemically adhered, or mechanically interlocked or fastened using screws, nails and bolts. These types of connection methods have generally been shown to work well but can be time consuming in executing and resource intensive. Further, poor execution of the attachment method can lead to failure of the joint and ultimately failure of the frame.

As frame joints are often comprised of at least two separate components attached together by a third component or mechanism, they can be considered structural points of weakness or vulnerable points. Failure of a frame commonly occurs at joints. As a result, it is important to ensure a strong and reliable joint in a frame assembly.

One particular method of attaching frame components is through the use of a sleeve, whereby the sleeve receives and to an extent houses receiving ends of components. This joint method is often seen and used in the plumbing industry in the connection of two pipes. The sleeves are either adhered, mechanically fastened (through by example the use of a clamp, a clip, or a lip and recess system, a thread, or a coupling), or are sized to create a tolerance fit The use of a sleeve is advantageous in that it provides a relatively quicker connection and assembly time of a continuous network, for example a plumbing pipe network. However, when it comes to assembling a frame, the use of a sleeve can at times be difficult to execute as the frame is typically a closed network of components often rectangular in shape. The use of a sleeve, for example a 90° connector sleeve will require some degree of flex in the other pre-assembled components as well as the sleeve itself to allow the sleeve to receive the components.

Given the importance of structural integrity to a frame, the amount of allowed flex in frame components is intentionally limited. Therefore, when using a sleeve, the flexing of structural components can cause a weakening in the structural integrity of those components and any other downstream joints. It is not uncommon for other joints or components to fail during the installation of a sleeve type connecter as a result of flexing the structure to accommodate the sleeve.

During the disassembly of frames utilising sleeve type connectors, the frame components will also be required to flex to allow enough space for the removal of the connectors. Often, the sleeve is entirely cut out and replaced with a series of adapters and sleeves. Again, it is not uncommon for the connector itself, or other joints or components of the frame to fail during disassembly due to flexing.

It would therefore be desirable to address at least partially one or more of the shortcomings mentioned above of existing connectors used to attach frame components.

SUMMARY OF INVENTION

According to a broad aspect of the invention, there is provided, a component connector comprising: a body having a first end for receiving a portion of a first component and a second end for receiving a portion of a second component, a locking member moveable relative to the connector body between a locked position and an unlocked position, wherein, in the locked position, the locking member engages with the connector and restricts movement of at least one of the first component and the second component portions relative to the connector body, and in the unlocked position the locking member at least partially disengages with the connector body, thereby allowing relative movement between the connector and at least one of the first and second component portions.

The component connector allows for the connection of at least two components in an assembly without having to subject the components or the connector to undue stress or flex. The at least partial disengagement of the locking member from the connector body allows for a portion of a component to be installed into a receiving end of the connector by simply placing it in the installation position. The locking member is then moved into the locked position to restrict the movement of the component portion relative to the connector body.

When the locking member is in the locked position, the first component portion and/or the second component portion received by the connector body may be substantially restricted from moving relative to the component connector in all but one direction. It may have only one degree of freedom. When the connector is used in a closed loop type assembly, movement in this single direction will be obstructed. To release a component from the loop connection, the locking member is merely moved into the unlocked position.

When the locking member is in the unlocked position, the first component portion and/or the second component portion received by the connector body is substantially unrestricted from moving relative to the component connector in at least two directions. It has at least two degrees of freedom.

In one embodiment the locking member is moveable between the locked position and the unlocked position by sliding, along and/or across a section or sections of the connector body. Alternatively, the locking member may be rotatable about a section or sections of the connector body, between a locked and unlocked position. In a further alternative embodiment, the locking member may pivot about an axis running along and/or across the connector body between a locked or unlocked position. In a further alternative embodiment, the locking member may be hinged to the connector body. The movement of the locking member between a locked and an unlocked position allows for the unobstructed insertion of a portion of a component into a section of the body of the connector, and the subsequent locking of the portion within the component body, whereby the portion is obstructed from movement relative to the freedom of movement in the unlocked position.

The movement of the locking member relative to the connector body can be limited beyond a locked position by a stop. In one embodiment, a stop is integral or attached to the locking member. The stop may be in the form of a stopping tab, whereby the tab is sized so as to not fit through a section or an aperture of the body.

In an alternative embodiment the stop may be integral with or attached to the connector body, whereby it obstructs movement of the relative locking member beyond a certain point along or through the connector body. The stop may be a recessed section of the connector body which receives a portion of the locking member. The recessed section may be positioned along a single or multiple side walls of the connector body. In a further alternative embodiment, the locking member may have a protruding section designed to be received in the recessed portion of the body, so as to ensure a flush fit of the locking member in the locked position.

The locking member may remain attached to connector body in the unlocked position, but moveable relative to the connector body. In this embodiment the locking member may remain entirely connected to the connector body, or partially separated from the connector body. For example, the connector body may have a groove and the locking member may have a corresponding lip which fits in the groove. The groove in this embodiment may guide the relative movement of the locking member along or across the body of the connector between the unlocked and locked position. Alternatively, the locking member may comprise a hinged connection with the connector body, or the locking member may be pivotally connected to the connector body. The hinged movement or the pivoting of the locking member relative to the connector body will result in the locking member at times being partially separated from the connector body.

In a further alternative embodiment, the locking member may be completely detachable from the connector body in the unlocked position, and fastened to the connector body when in the locked position, either mechanically or magnetically.

To fortify the connection of a component portion within the connector body, the locking member may be mechanically fastened to the connector body when in the locked position. The mechanical fastening may be in the form of a resilient snap fit member which engages with a corresponding snap-fit receiving section in the connector body when in the locked position. In the snap-fit connection, corresponding sections of the connector body and the locking member interlock.

Where the locking member rotates about sections of the connector body, the mechanical fastening may be in the form of a thread. In this embodiment, the locking member and the connector body may comprise a complimentary threaded arrangement, wherein rotation of the locking member is guided by the threaded arrangement. The threaded arrangement would provide a guide and facilitate a controlled transition between a locked position and an unlocked position.

To further fortify the connection of the locking member in the locked position to the connector body, the locking member and the connector body may further comprise complementary magnetic strips.

In one embodiment, the connector body may comprise a magnetic strip. Alternatively, the first and/or second ends of the connector body may be magnetised to attract magnetic materials from which a first or second component may be made of. The magnetic force between the component body and the magnetic components is envisioned to expedite the construction of an assembly whilst also fortifying the connection between the connector and the components.

The component connector is not necessarily restricted to two receiving ends. It may comprise a third end for receiving a third portion of a third component, or any number of ends for receiving any number portions of any number of components.

According to another broad aspect of the invention there is provided a method of connecting components using the component connector of any one of the above embodiments, the method comprising: placing the locking member into the unlocked position; inserting a portion of a first component into the first end of the connector; inserting a portion of a second component into the second end of the component connector; and moving the locking member into the locked position. The ability to place the locking member in the unlocked position allows for the connection of components in an assembly in an expedient manner, without having to unduly flex or stress the connector body or the components to be connected, or any other components forming part of a structure downstream of the components to be connected. This reduces the risk of breakage, damage or the weakening of the components or the connector.

According to a further broad aspect of the invention there is provided a component connector comprising: a body having a first end for receiving a portion of a first component and a second end for receiving a portion of a second component; a locking mechanism which mechanically or magnetically fastens the portion of the first component to the body and/or the portion of the second component to the body, wherein, the first component portion and/or the second component portion received by the connector body is substantially unrestricted from moving relative to the component connector in at least two directions when not engaged by the locking mechanism.

In one embodiment, the locking mechanism may be a mechanical fastening mechanism in which the connector body comprises at least one protruding node. The at least one node engages with a corresponding receiving recess or aperture/hole in the receiving portion of the component when engaging the locking mechanism.

In an alternative embodiment in which the locking mechanism is a mechanical fastening mechanism, the connector body and the receiving portions may have a snap fit arrangement. The snap fit arrangement may be in the form of a resilient protrusion in the connector body and a recess in the receiving portion of the component to be connected, or vice versa. Upon contact with each, the protrusion snaps into the recess, locking the receiving portion of the first or second component to the connector body.

In an alternative embodiment the locking mechanism locking the connector body and the receiving portions of the first and/or second components may be magnetic. The connector body may have a magnetic strip along a portion of the first and/or second end. The receiving portions of the components may be magnetic and lock into the connector body due to the magnetic force exerted by the strip. Alternatively, the connector body may be magnetised or components to be connected may also comprise complementary magnetic strips.

The component connector allows for the connection of at least two components in an assembly without having to subject the components or the connector to undue stress or flex. This significantly reduces, and potentially eliminates, the risk of damaging assembly components as it drastically reduces the amount of flex the connector and the components are subjected to. The at least partial disengagement of the locking member from the connector body allows for a portion of a component to be installed into a receiving end of the connector by simply placing it in the installation position. The locking member is then moved into the locked position to restrict the movement of the component portion relative to the connector body thus providing a secure connection.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

BRIEF DESCRIPTION OF DRAWINGS

It will be convenient to hereinafter describe preferred embodiments of the invention with reference to the accompanying figures. The particularity of the figures is to be understood as not limiting the preceding broad description of the invention.

FIG. 1 shows a first embodiment of the component connector.

FIGS. 2(A)-2(C) show second embodiment of the component connector.

DETAILED DESCRIPTION

Referring to FIGS. 1 to 15, there is illustrated different embodiments of a component connector. The component connector has been specifically designed to significantly reduce and potentially eliminate any need to stress or flex components of a frame when connecting components together and during the assembly of the frame.

In FIGS. 1 to 13 there is illustrated embodiments of a component connector 2, 32, 60, 102, 132, 172, 202, 222, 242, 262, 292, 342, 364, having a body 4, 34, 62, 104, 134, 174, 204, 224, 244, 264, 294, 344, 366 and a locking member 6, 36, 64, 106, 136, 176, 206, 226, 246, 266, 296, 346, 368. Each of the embodiments of FIGS. 1 to 13 differs in the arrangement and/or configuration of the component connector body 4, 34, 62, 104, 134, 174, 204, 224, 244, 264, 294, 344, 366 and the locking member, 36, 64, 106, 136, 176, 206, 226, 246, 266, 296, 346, 368. The following paragraphs will describe the embodiments of FIGS. 1 to 13.

Figure 11:
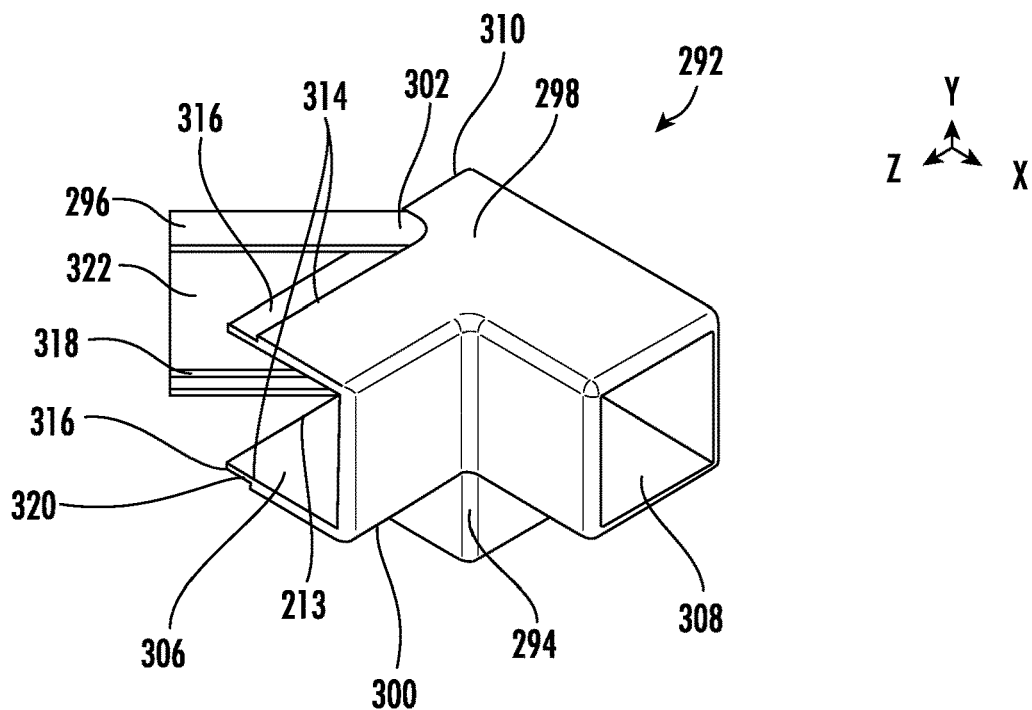
FIG. 11 shows an eleventh embodiment of the component connector.
Figure 12:
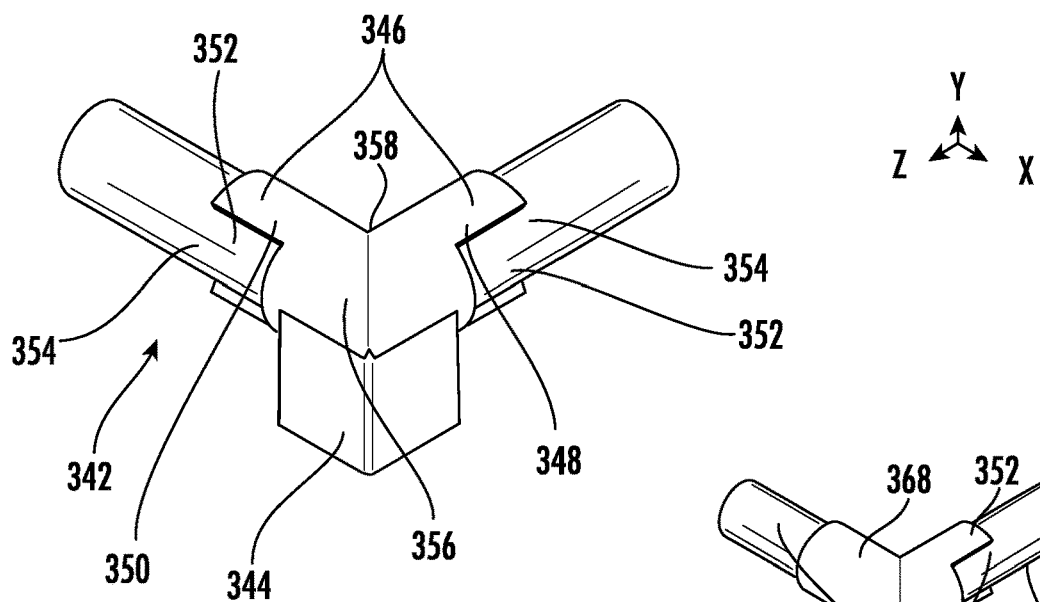
FIG. 12 shows a twelfth embodiment of the component connector.
Figure 13:
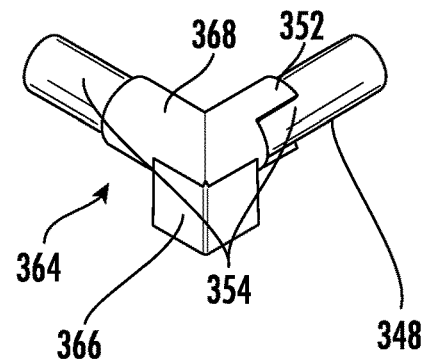
FIG. 13 shows a thirteenth embodiment of the component connector.

The component connector 2, 32, 60, 102, 132, 172, 202, 222, 242, 262, 292, 342, 364 of FIGS. 1 to 13 comprises a body 4, 34, 62, 104, 134, 174, 204, 224, 244, 264, 294, 344, 366 having a first end 8, 48, 74, 108, 138, 208, 245, 265, 306, 348, 410, 430 for receiving a portion of a first component 112, 142, 354 (see FIGS. 4, 5 and 12) and a second end 10, 50, 76, 110, 140, 158, 210, 247, 267, 308, 350, 412, 432 for receiving a portion of a second component 354 (only shown in FIGS. 12 and 13). In the drawings, the ends are circular, rectangular or square. It is to be appreciated that the ends can be of any suitable shape.

The component connector 2, 32, 60, 102, 132, 172, 202, 222, 242, 262, 292, 342, 364 further comprises a locking member 6, 36, 64, 106, 136, 176, 206, 226, 246, 266, 296, 346, 368. The locking member 6, 36, 64, 106, 136, 176, 206, 226, 246, 266, 296, 346, 368 is moveable relative to the connector body 4, 34, 62, 104, 134, 174, 204, 224, 244, 264, 294, 344, 366 between a locked position and an unlocked position.

In the locked position, the locking member 6, 36, 64, 106, 136, 176, 206, 226, 246, 266, 296, 346, 368 engages with the connector body 4, 34, 62, 104, 134, 174, 204, 224, 244, 264, 294, 344, 366 and restricts relative movement between the connector 2, 32, 60, 102, 132, 172, 202, 222, 242, 262, 292, 342, 364 and at least one of the first and/or second component 112, 142, 354. In the locked position, a component portion 112, 142, 354 inserted in the body 4, 34, 62, 104, 134, 174, 204, 224, 244, 264, 294, 344, 366 has only one degree of freedom.

In the unlocked position the locking member 6, 36, 64, 106, 136, 176, 206, 226, 246, 266, 296, 346, 368 at least partially disengages with the connector body 4, 34, 62, 104, 134, 174, 204, 224, 244, 264, 294, 344, 366 thereby allowing relative movement between the connector 2, 32, 60, 102, 132, 172, 202, 222, 242, 262, 292, 342, 364 and at least one of the first and second component portions 112, 142, 354. In this unlocked position the component portions 112, 142, 354 have at least two degrees of freedom of movement.

The embodiments shown in FIGS. 1 to 11 show the component connector 2, 32, 60, 102, 132, 172, 202, 222, 242, 262, 292, in a partially unlocked or fully unlocked configuration. The embodiments of FIGS. 12 and 13 show the component connector 342, 364 in a locked configuration.

Referring to FIG. 1, the locking member 6 transitions between the locked position and the unlocked position by sliding across a section of the connector body 4. This section is a side wall portion 20 of the first end 8 of the connector body 4. The first end 8 comprises an aperture 14 in a top wall, through which the locking member 6 moves through. In the unlocked position, the side wall portion 20 of the first end 8 remains open and can receive a portion of a first component 12.

To transition to a locked position, the locking member 6 slides across the open side wall portion 20 to close off the opening. By closing the opening, the locking member 6 acts as a side wall. It prevents a portion of a first component 12 from moving out of the component body 4 through the previously open side wall portion 20. A first component portion 12 enclosed in the connector 2 when the locking member 6 is in the locked position is restricted from moving along the Y or X axis, and can only move in one direction, being the Z axis. In this respect, it has one degree of freedom.

In FIG. 1, the movement of the locking member 6 is limited by a stop 16. The stop 16 also minimise movement of the locking member 6 in the locked position. The stop 16 is in the form of a recess 16 in the side wall which receives the locking member 4. In the embodiment of FIG. 1, the locking member 6 is entirely detached from the connector body 4 when in the unlocked position. To allow a user to move the locking member 4 with ease, the locking member 4 has a gripping tab 18 which can be gripped by a user. This tab also acts as a stop as it exceeds the size of the aperture 14 through which the locking member 6 travels.

Although not shown in the drawings, it is to be appreciated that the locking member 6 and the corresponding wall opening 20 can be positioned along any wall or any end 8, 10 of the component connector 2.

The component connector 32 of FIG. 2(A)-2(C), although conceptually similar to FIG. 1, differs in that the locking member 36 transitions between the locked and unlocked position by moving along a section of the first end 38 of the component body 34. Specifically, the locking member 36 moves along an opening in the top wall section 42 of the component body first end 48 (as opposed to across an opening in a side wall 22 in FIG. 1). The locking member 36 moves along the Z-axis.

When in the unlocked position, the locking member 36 can remain partially attached or be entirely detached from the connector body 34. To transition to a locked position, the locking member 36 moves along the top wall 42 and is guided by wall guides 46 running along the Z-axis. The wall guides 46 are grooves recessed into side walls 38 and 40. The locking member 36 has a protruding section 52 which is received by the recessed guides 46.

Once the locking member 36 covers the entire opening in the top section 22, it is in the locked position. Any first component portion (not shown in the Figure) enclosed in the connector 32 when the locking member 36 is in the locked position is restricted from moving along the Y or X axis, and can only move in one direction, being the Z axis. That is, it will have a single degree of freedom.

Movement of the locking member 36 by a user is assisted by the presence of a movement tab 54, which protrudes in the Y-axis, externally from the connector body.

As shown in FIG. 2(C), movement of the locking member 36 beyond the locked position may be limited by a stop in the form of a protruding stop 37 in the locking member 36. Once this stop comes into contact with the connector body 34, it obstructs the locking member 36 from moving any further along the Z-axis, beyond the locked position.

It is to be appreciated that the locking member 36 and the corresponding wall opening 42 can be positioned along any wall or any end 48, 50 of the connector 32. For example, the component connector 56 has the locking member 36 and corresponding recessed guides 46 running along the second side wall 38.

Figure 3:
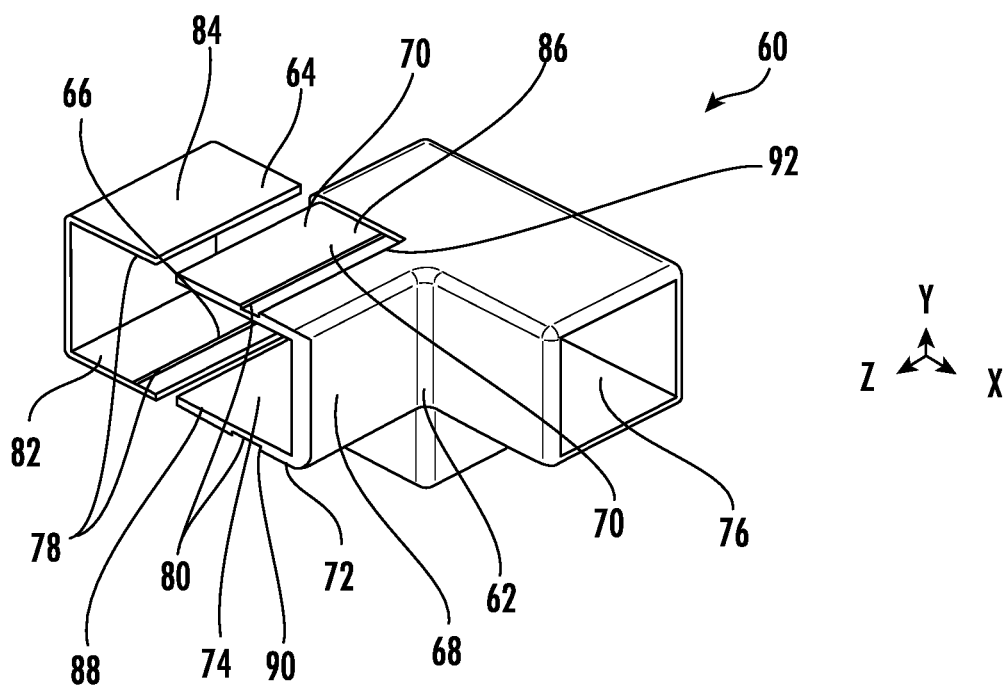
FIG. 3 shows a third embodiment of the component connector.

The component connector 60 of FIG. 3 is conceptually similar to the component connector 2, 32 of FIGS. 1 and 2. However, in FIG. 3 the locking member 64 of FIG. 3 slides over a side wall 66 opening, and envelopes the bottom wall 70 and top wall 70 of the connector body 62. The bottom wall 72 and the top wall 70 have locking member receiving sections 86, 88. The receiving sections have a thinner wall thickness relative to the rest of the connector body 62. At the line along where the thickness changes, 90, 92 an edge is created along which the locking member 64 can rest on when in the locked position. The edges 90, 92 also serve to limit the movement of the locking member 64, and act as stops in this regard.

When in the locking member 64 is in the locked position side wall opening 66 is closed off. To resist any force along the x-axis whilst in the locked position, the locking member 64 is mechanically fastened to the connector body 62. Specifically, the locking member 64 has protruding tabs 78 which interlock in a snap fit arrangement with recessed grooves 80 situated externally on walls 66 and 68. The locking member arms 82 and 84 are resilient and biased to a degree, so as to create a strong snap-fit connection with the connector body 62. The grooves 80 also act as movement guide of the locking member along the z-axis.

Although not shown in the drawings, the receiving sections 86, 88 may be positioned internally on the walls 66 and 68. In this alternate configuration the locking member 64 would be enveloped by the internal walls of the connector body 62. Said walls would comprise internal recesses which interlock in a snap fit arrangement with a protrusion along the external walls 82, 84 of the locking member 64.

To remove the locking member 64 from the locked position, the locking member 64 may move/slide along the Z-axis away from the first end 74 of the connector body 62. Alternatively, the outer walls 90, 92 of the locking member 64 may be lifted to release the locking member 64 from the snap fit interlocking connection with the connector body 62. In this respect, when in the unlocked position, the locking member 64 is completely detached from the connector body 62.

Although not shown in the drawings, it is to be appreciated that the locking member 64 and the corresponding wall opening 66 can be positioned along any wall 66, 68, 70, 72 or any end 74, 76 of the connector 60.

Figure 4:
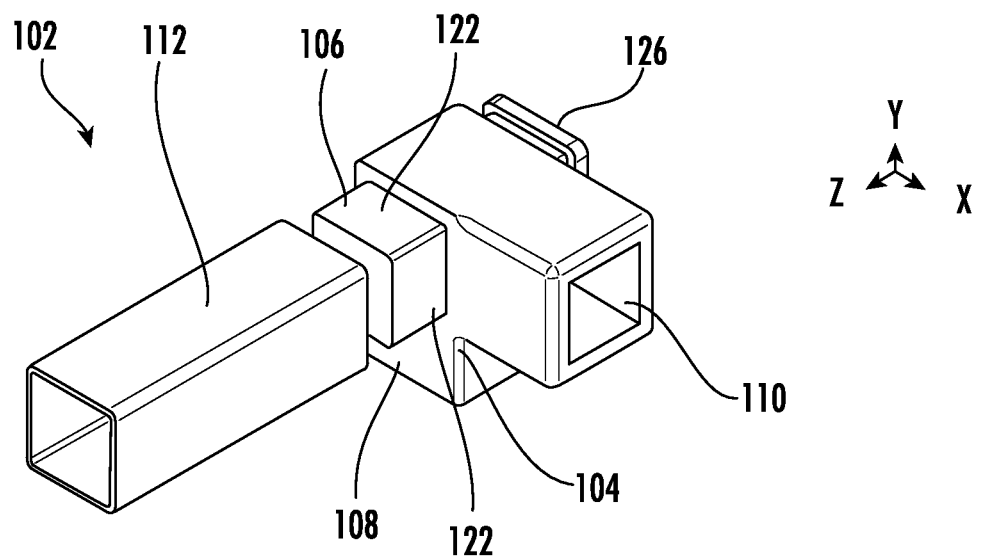
FIG. 4 shows a fourth embodiment of the component connector.

The FIG. 4 component connector 102 has a locking member 106 which is inserted into the connector body 104 and into a component 112 to be attached.

The connector 102 of FIG. 4 has a body 104. The body has a first end 108 for receiving a portion of a first component 112 and a second end 110 for receiving a portion of a second component (not shown in the drawings). A locking member 106 is moveable relative to the connector body 104 between a locked position and an unlocked position.

In the unlocked position, the locking member 106 at least partially disengages by being moved backwards and at least partially out of the body aperture 124. In the unlocked position, a component 112 cannot be attached to the connector 102.

When transitioning into the locked position, the locking member 106 moves through the connector body 104 along the Z-axis and protrudes out of the body 104 and internally into the first component 112. The locking member 106 engages and restricts the movement of the first component 112 in all directions apart from movement along the Z-axis.

Movement of the locking member 106 through the connector body 104 is limited by stops 126 which exceed the width and/or height of the aperture 124 of the connector body 104 through which the locking member 106 moves.

Although not shown in the drawings, it is to be appreciated that the connector 102 can be configured such that the locking member 106 is hollow and acts as a sleeve which envelopes a first or second component when in the locked position.

Figure 5:
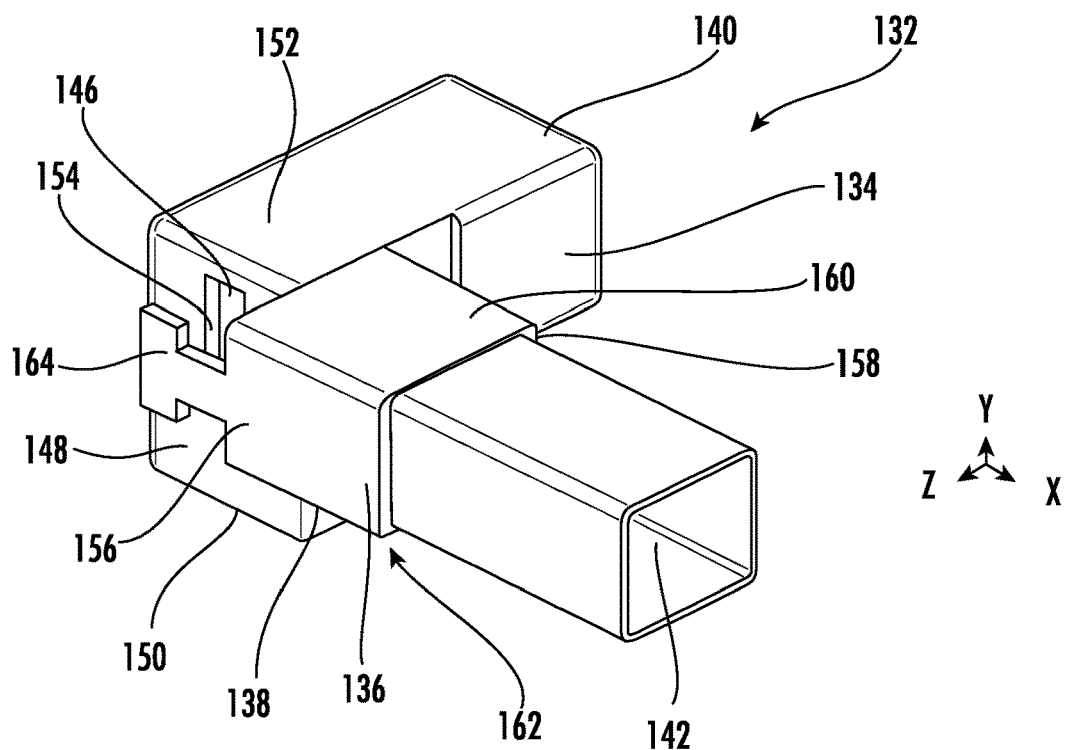
FIG. 5 shows a fifth embodiment of the component connector.

The component connector 132 of FIG. 5 is conceptually similar to the connectors 2, 32, 62, 102 of FIGS. 1 to 4. However, it differs in that it comprises a puzzle like arrangement between the connector body 134 and the locking member 136.

The connector body 134 has a first end 136 and a second end 138. Along a first side wall 148 of the first end 138 there is a recess 146. The recess has edges 154 which limit the movement of the locking member 136.

The locking member 136 has a first side 156, a second side 158, a top side 160 and a bottom side 162. Along the first side there is an elongated section 164 which is received by the recess 138 in a similar way to how two pieces of a puzzle are received and interlock. Although not visible in the drawings, the elongated section has a mating protrusion which is received within the connector body recess 146.

The locking member 136 receives and houses a portion of a first component 142 within its internal perimeter. In the unlocked position, the locking member 136 is detached from the connector body 134 by moving it away from the body 134 and/or along the first component 142.

In the locked position, the locking member 142 interlocks with the body 134 whereby the protrusion of the elongated section 164 is received in the connector body recess 146. This configuration is functional when frame components are also enveloped by a fabric, in particularly a resilient fabric. To release the locking member 136 from the locked position, the locking member 136 can be merely moved out of engagement from the connector body 142. It is to be appreciated that the shape and configuration of the connector body 134 and the locking member 136 can be altered if required to further improve strength and/or stability of connection.

Figure 6:
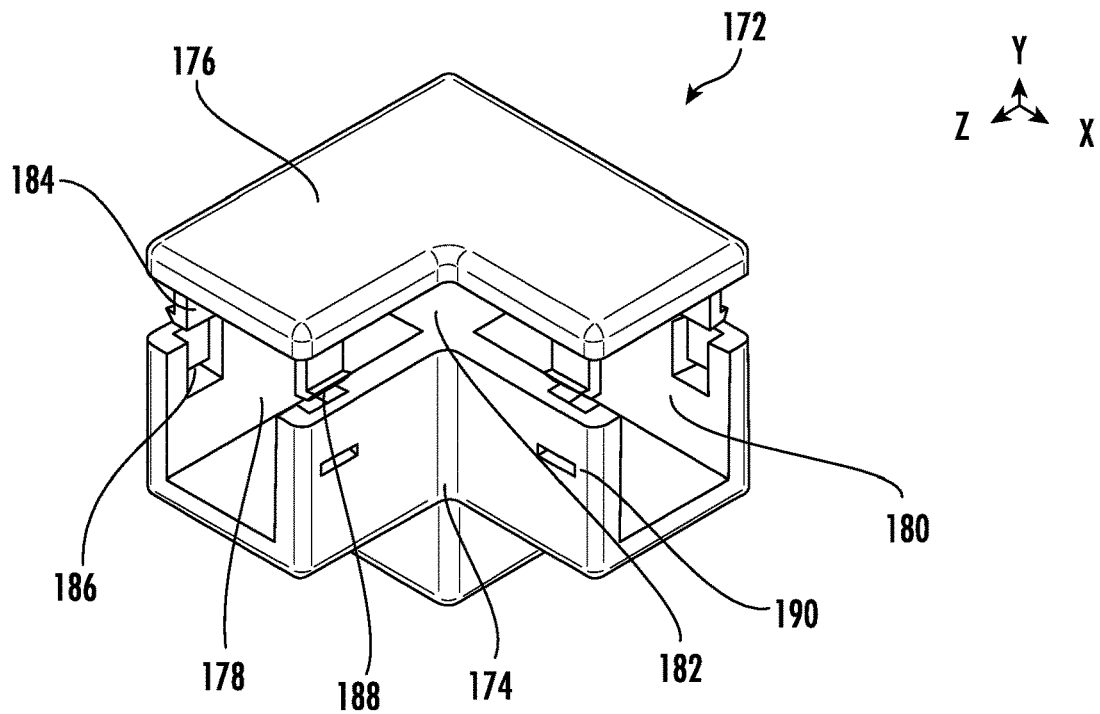
FIG. 6 shows a sixth embodiment of the component connector.

In FIG. 6, the component connector 172 utilises a snap-fit interlocking arrangement between the connector body 174 and the locking member 176. The connector body has two top surface openings 178, 180: a first side top surface opening 178 and a second side top surface opening 180.

In the unlocked position, the locking member 176 is completely detached from the connector body 174, exposing the top surface openings 178, 180. Components (not shown in the drawing) can be inserted into and removed from the connector body 174 through these openings 178, 180.

In the locked position the locking member 176 is placed along the top surface 182 and at least partially covers the top surface openings 178, 180. The locking member 176 interlocks with the connector body 174 through a snap fit arrangement which involves passing legs 184 of a locking member 176 along and through receiving recesses/apertures 186 in the connector body 172. The legs 184, which are biased and are resilient, have lips 188. The lips 188 are designed to pass through connector body apertures 190, thus locking the locking member 176 in the locked position.

Although not shown in the drawings, connector body 174 may only comprise a top surface opening on only one of the first side 178 or the second side 180 of the connector 172. The locking member 176 in this alternative embodiment is configured to cover the top surface aperture and to interlock with the connector body 174 through a snap-fit arrangement.

Figure 7:
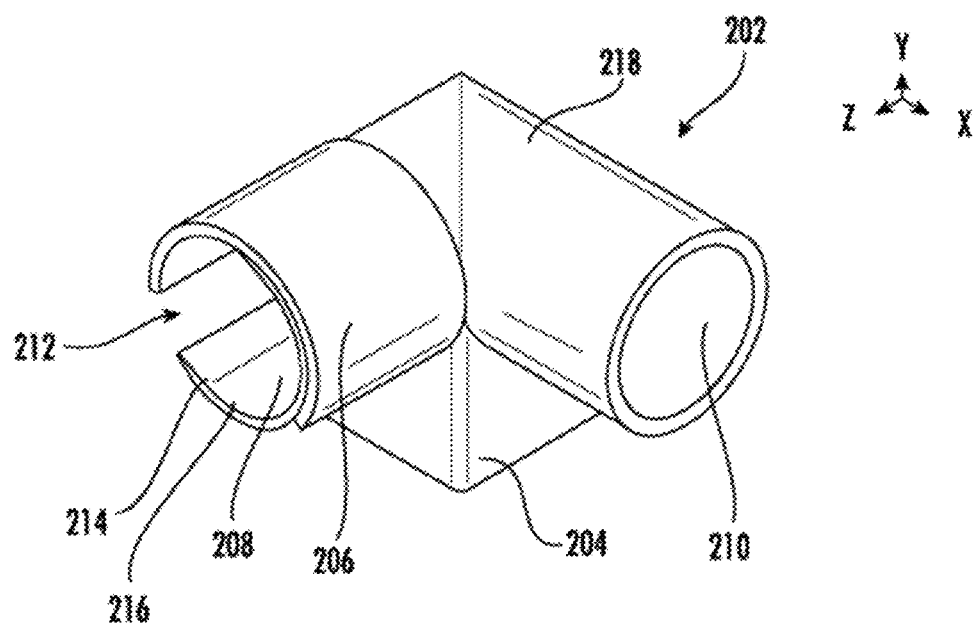
FIG. 7 shows a seventh embodiment of the component connector.
Figure 8:
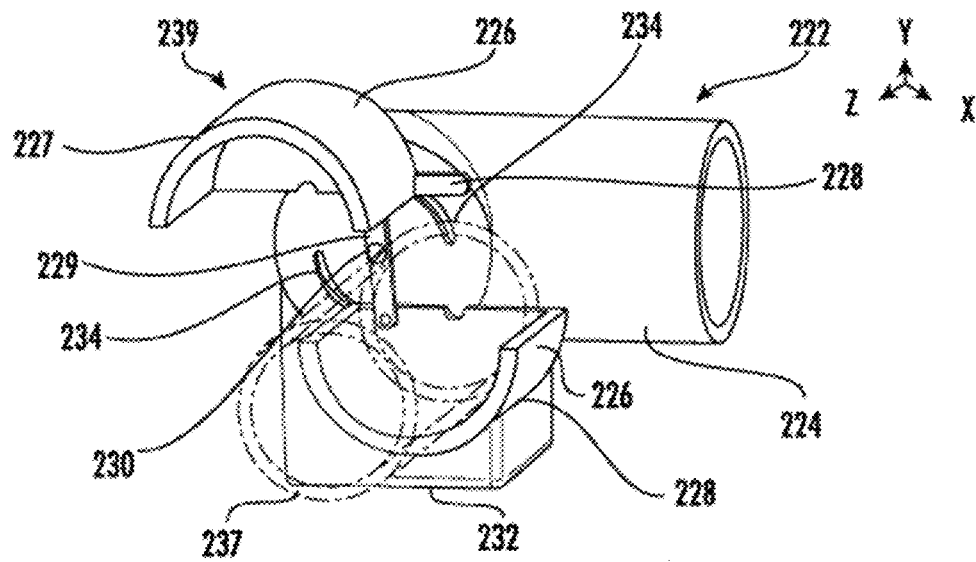
FIGS. 8(A) and 8(B) show an eighth embodiment of the component connector.
Figure 8:
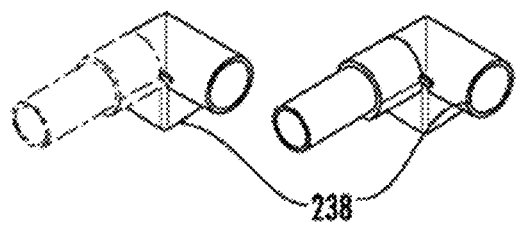

In FIGS. 7 and 8 the component connectors 202, 222 are designed to receive circular components, as opposed to square or rectangular components. Both connectors 202, 222 utilise rotation of the locking members 206, 226 relative to the connector body 204, 224 to transition the locking members 206, 226 between the locked and unlocked position.

In FIG. 7, the component connector 202 has a component body 204. The component body has two circular open ends 208, 210 for receiving portions of a component (not shown in the drawings). In one end there is an opening 212, which is covered or exposed by a locking member 206 depending on whether the locking member 206 is in the locked or unlocked position. When the opening 212 is exposed in its entirety, a portion of a component can move into and out of the corresponding end 208 of the connector body.

The locking member 206 is sized so as to entirely cover the connector body opening 212 when in the locked position thus obstructing any component from moving out of the opening 212. In this respect, a component only has one degree of freedom along the Z-axis. The locking member 206 is also sized to at least partially expose the opening 212 in the unlocked position to allow a component to move through the opening 212. Therefore, when the locking member 206 is in the unlocked position, the component has at least two degrees of freedom.

In the unlocked position, the locking member 206 remains attached to the connector body 204. In the embodiment of FIG. 7, the locking member 206 remains attached to the outer surface of the connector body 204, specifically the outer surface of end 208.

To transition into the locked position, the locking member 206 rotates about the outer surface of the connector body 204 up until it covers the opening 212 to such an extent that a component portion can no longer fit through the opening 212.

In FIG. 7, there is an internal stop 214 integral with the connector body which limits the extent to which the locking member 206 can rotate. The stop appears as a lip 214. In this respect, the locking member 206 is partially enveloped by internal surface 216 of the connector body 204 when in the locked position.

In an alternative embodiment not shown in the drawings, the internal stop 214 may be positioned on the outer surface 218 of the connector body. In this alternative embodiment the locking member 206 remains on the external surface of the connector body 204. In a further alternative embodiment, a stop may be integral with the locking member 206.

Although not shown in the drawings, the locking member 206 may merely slide on or off the connector body 204 along the z or x axis. Alternatively, the locking member 206 may be mechanically fastened to the connector body 204 through a threaded connection. In this alternate embodiment, the locking member 206 and the connector body 204 may comprise a complimentary threaded arrangement, wherein rotation of the locking member is guided by the threaded arrangement. The threaded arrangement would provide a guide and facilitate a controlled transition of the locking member 206 between a locked position and an unlocked position.

The connector 222 of FIGS. 8(A) and 8(B) is similar to that of FIG. 7 in that the locking member 226 rotates between a locked position and an unlocked position.

In the embodiment of FIGS. 8(A) and 8(B), the locking member 226 has a first part 227 and a second part 228. The first part 227 and the second part 228 are attached to an arm 229 at attachment points. The points at which the arm 229 is attached to the first part 227 and second part 228 are 180° apart. The attachment arm 229 is pivotally attached at a pivot point 230 to a first end 232 of the connector body 224. Recessed grooves 234 in the first end 232 of the connector body 224 guide the movement of the locking member 226 into the locked position 238 and out of the locked position to the unlocked position 239.

The locking member 226 has a protruding lever 228 which a user can grasp or push to move the member 226 between the unlocked 239 and the locked position.

In the unlocked position, the locking member attachment arm 229 pivots about point 230 into a position in which the first part 227 and the second part 228 are separated. A component 237 is able to be received by the first part 227. The recessed grooves 234 acts as a stop and prevent the locking member 226 from slipping back into the locked position.

To transition the locking member 226 into a locked position, the arm is pivoted about attachment point 230 such that the first 227 and second 228 parts of the locking member 226 enclose the component 237 at least partially concealing the opening through which a component move through when the locking member 226 is in the unlocked position 239. In the embodiment shown in FIGS. 8(A) and 8(B), the first part 227 and second part 228 are in contact with each other in the locked position 238. The recessed grooves 234 limit the movement of the locking member 226 parts 227, 228 beyond the locked position and back into the unlocked position.

In an alternative embodiment not shown in the drawings, the locking member 226 may only comprise a first part 227, whereby the first part is moveable across the X and Y axis into and out of the locked position.

Figure 9:
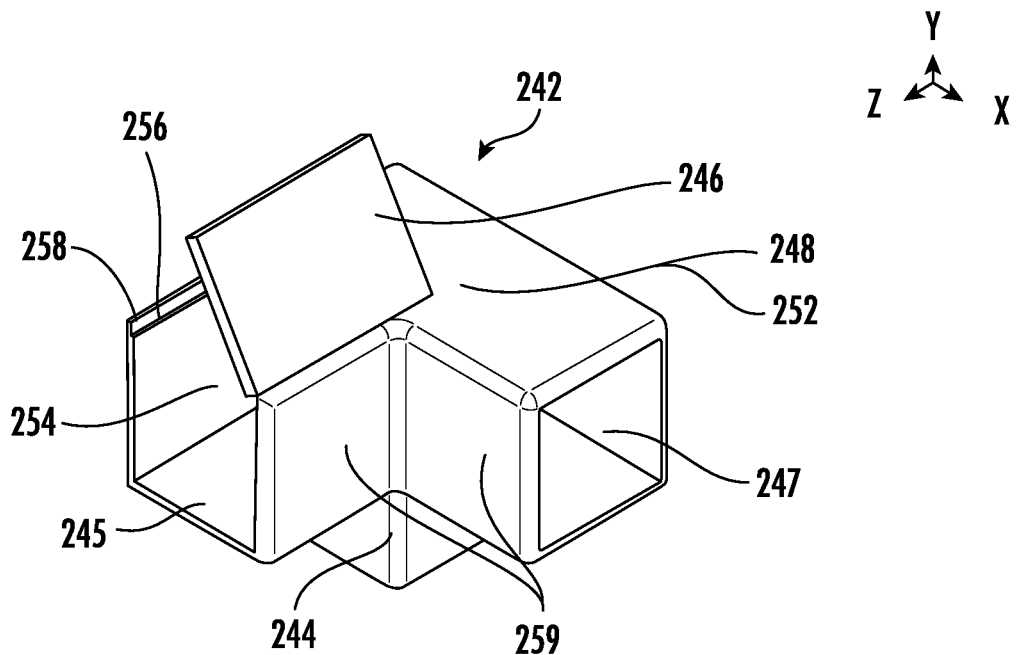
FIG. 9 shows a ninth embodiment of the component connector.
Figure 10:
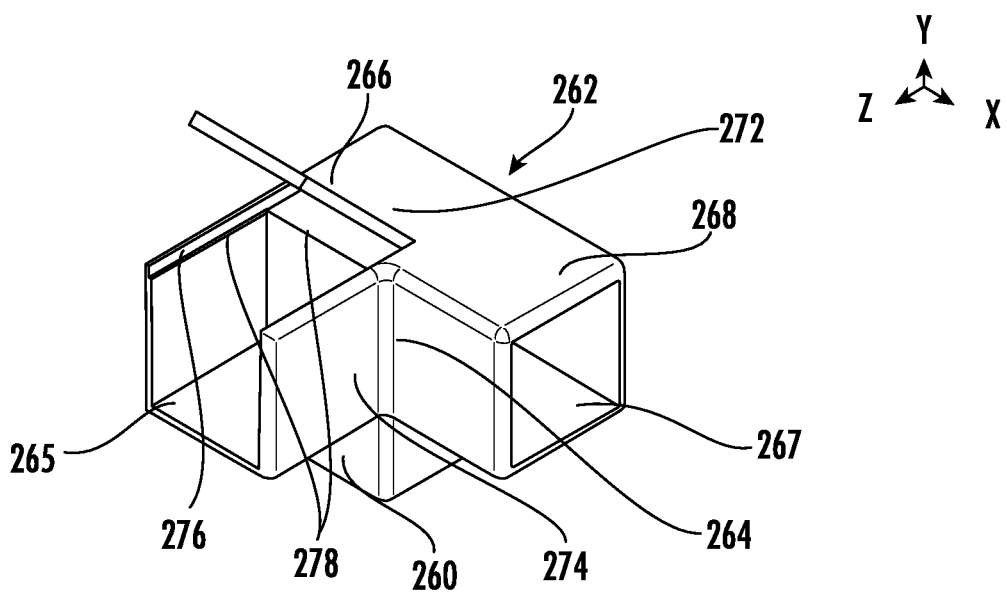
FIG. 10 shows a tenth embodiment of the component connector.

FIGS. 9 to 11 depict embodiments of a component connector 242, 262, 272 with a hingedly movable or pivotally movable locking member 246, 266, 296. The locking member 242, 262, 292 of each embodiment remains attached to the connector 242, 262, 292 in both the locked an unlocked position, and moves relative to the connector body 244, 264, 294.

In FIG. 9, the locking member 246 is pivotably connected 252 to the top surface 248 of the connector body 244, and spans across a first end 245 of the connector body 244. Although not shown in the drawings, the pivot connection can be in the form of a weakened line across or along the connector body 244 to allow movement of the locking member 246. In this respect, the locking member 246 is akin to an integral flap. Alternatively, the locking member may be a separate component entirely hingedly connected to the body 244 by a hinge, a rod or a series of nodes.

To transition between a locked an unlocked position, the locking member 246 pivots about the connection 252 relative to the connector body 244. In the unlocked position, the locking member 246 pivots relative to the body 244 so as to reveal an opening through which a portion of a component (not shown in the drawings) to be connected to the connector can pass through and enter the connector body 244.

In the locked position, the locking member 246 conceals the opening 254. The locking member 246 is obstructed from moving beyond the locked position into the connector body by a stop 256. In the FIGS. 9 and 10, the stop 256, 276 is an edge or edges formed along recessed 258, 278 wall sections. The wall recesses 258, 278 allow the locking member 246, 266 to sit flush with the top surface 248, 268 of the connector body 244, 264.

In FIG. 9, the pivot connection 252 between the locking member 246 and the connector body 244 runs across the connector body first end 245, along the X-axis. FIG. 10 shows an alternate configuration where the pivot connection 272 runs along the connector body first end 265, along the Z-axis.

Although not shown in FIGS. 9 and 10, the second body end 247, 267 may be configured in the same way as the first body end 245, 265. In such an embodiment the same moveable locking member 246, 266 is applied to the second end 247, 267. In a further alternative embodiment not shown in FIG. 9 or 10, the locking member may be positioned on a side wall 259, 274 (see for example, embodiment 292 of FIG. 11), or a bottom wall 250, 270 of the connector body 242, 262.

The component connector 292 of FIG. 11 has a locking member 296 which is pivotally moveable relative to the connector body 294. The locking member 296 remains attached to the connector in both the locked and unlocked position.

The locking member 296 is connected to the connector body at two points. The first connection point 302 is on the top surface 298, and the second point (not visible in FIG. 11) is the bottom surface 300.

The locking member 296 spans across the outer side wall 310 of the first end 306 of the connector body 294. The locking member 296 is a separate component to that of the connector body 294. The first 302 and second connection points act as pin joints. Although not shown in the drawings, a pin may extend between the two connection points to create a single pin joint. Alternatively, the locking member 296 may comprise nodes which are received by recesses or apertures in the connector body 294, in a similar configuration to a pin joint.

To transition between a locked and an unlocked position, the locking member 296 pivots about the pin joints 302. In the unlocked position, the locking member 296 pivots relative to the body 294 so as to reveal an opening 312 through which a portion of a component (not shown in the drawing) to be connected to the connector 292 can pass through and enter the connector body 294.

In the locked position, the locking member 296 conceals the opening 312. The locking member 296 is obstructed from moving beyond the locked position into the connector body by a stop 314 in the form of an edge or edges formed along recessed 316 wall sections. The wall recesses 258, 278 allow the locking member 296 to sit flush with the outer side wall 310 surface of the connector body 294.

A snap-fit arrangement is used to secure the locking member 296 in the locked position. In this arrangement a resilient protruding section 318 of the locking member 296, is designed to interlock with a recessed groove 320 of the connector body. Although not shown in the drawings, this arrangement can be duplicated on the opposite side of the locking member 296, and/or can be reversed in that the locking member may comprise a recessed groove, and the connector body 294 may comprise a corresponding protruding section.

The side walls 322 of the locking member 296 sit flush with the top and bottom surfaces 298, 300 of the connector body 294 due to the recessed wall sections 316 in the connector body 294. In an alternative embodiment not shown in FIG. 11, the locking member 296 maybe sized so as to inside the top and bottom surfaces 298, 300. In this respect, the recessed wall sections 316 would be positioned on the internal surface 322 of the connector body 294.

In FIG. 11, the locking member 296 pivots about the Y-axis, which runs across the opening 312. In an alternative embodiment, the connector 292 may have a separate or a further locking member 296 on the second body end 308. Further, the locking member 294, may pivot about any of the X, Y or Z-axis, and may be positioned on any of the side, top or bottom walls.

Referring to FIG. 12, there is shown a further embodiment of the component connector 342 which comprises a locking member 346 integral with first 348 and second 350 end of the connector body 344. FIG. 13 shows a locking member 368 (which is the same as that of FIG. 12, 346) formed in only the one end 348 of a connector body 366.

The locking members 346, 368 in FIGS. 12 and 13 are an integral and resilient section of the of the first 348 end. In FIG. 12, the locking member 346 is also an integral resilient section of the second end 350. The locking members 346, 368 have apertures 352 through which a portion of a component 354 can be forcefully pushed through. In this respect, the locking members 346, 368 are biased into the locked position. The locking members 346, 368 provide a snap-fit configuration Locking members 346, 368 transition temporarily to the unlocked position only once sufficient force is applied to the outer perimeter of the members 346, 368. In the unlocked position, the locking members 346, 368 increase in size due to expansion, and consequently the aperture 352 also increases in size. In the unlocked position, the aperture 352 is sufficiently large enough to accept a portion of a component 354.

Once a component portion 354 is locked into the connector body 342, 364 by a locking member 346, 368, it has a single degree of freedom. When the locking member 346, 368 is in the unlocked position, the component portion 354 has at least two degrees of freedom.

The aperture 352 is positioned on the outer external surface 356 (as opposed to the outer internal surface 358). Where a closed loop frame (not shown in the drawings), such as pet bed frame has a body comprising a tension spring, or a resilient and biased material through which the components are passed through/enveloped, the frame components 354 are pulled inwards towards the centre of the frame. Where the embodiment 342, 364 of FIGS. 12 and FIG. 13 are used, the connected components 354 are pulled in the opposite direction to where the aperture 352 is positioned.

Although not shown in the drawings, the connector 342, 362 may comprise an additional mechanical fastening mechanism such as a snap-fit recess and corresponding protrusion, with one featuring on the component portion 354 and the other featuring on the connector body 344, 366.

The component connectors 2, 32, 60, 102, 132, 172, 202, 222, 242, 262, 292, 342, 364 shown in FIGS. 1 to 13 allow for the connection of at least two components (not shown in all the drawings) 112, 142, 354 in an assembly without having to subject the components or the connector to any undue stress or flex. This significantly reduces, and potentially eliminates, the risk of damaging assembly components as it drastically reduces the amount of flex the connector and the components are subjected to. The at least partial disengagement of the locking member 6, 36, 64, 106, 136, 176, 206, 226, 246, 266, 296, 346, 368 from the connector body 4, 34, 62, 104, 134, 174, 204, 224, 244, 264,294, 344, 366 allows for a portion of a component 112, 142, 354 to be installed into a receiving end 8, 48, 74, 108, 138; 208, 245, 265, 306, 348, 410, 430, 10, 50, 76, 110, 140, 158, 210, 247, 267, 308, 350, 412, 432 of the connector 2, 32, 60, 102, 132, 172, 202, 222, 242, 262, 292, 342, 364 by simply placing it in the installation position. The locking member 6, 36, 64, 106, 136, 176, 206, 226, 246, 266, 296, 346, 368 is then moved into the locked position to restrict the movement of the component portion 112, 142, 354 relative to the connector body 4, 34, 62, 104, 134, 174, 204, 224, 244, 264,294, 344, 366 thus providing a secure connection.

Figure 14:
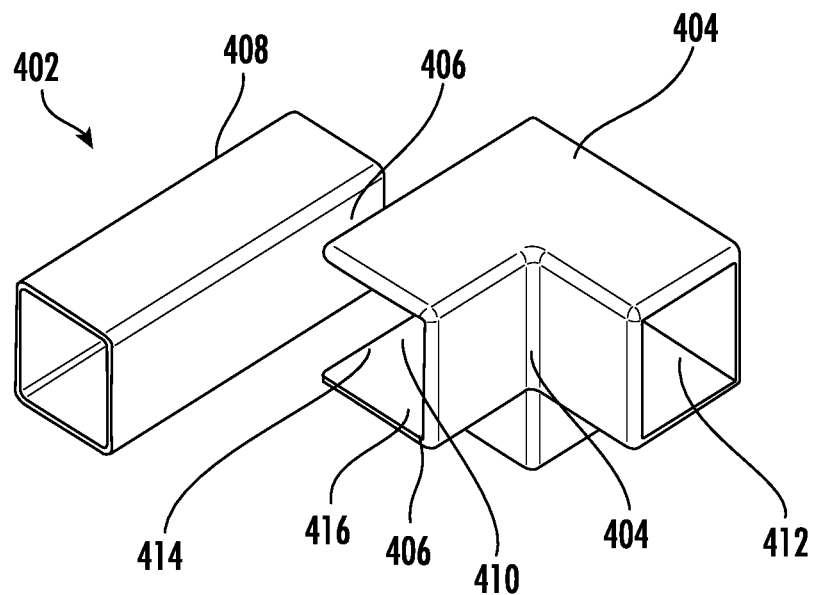
FIG. 14 shows a fourteenth embodiment of the component connector.
Figure 15:
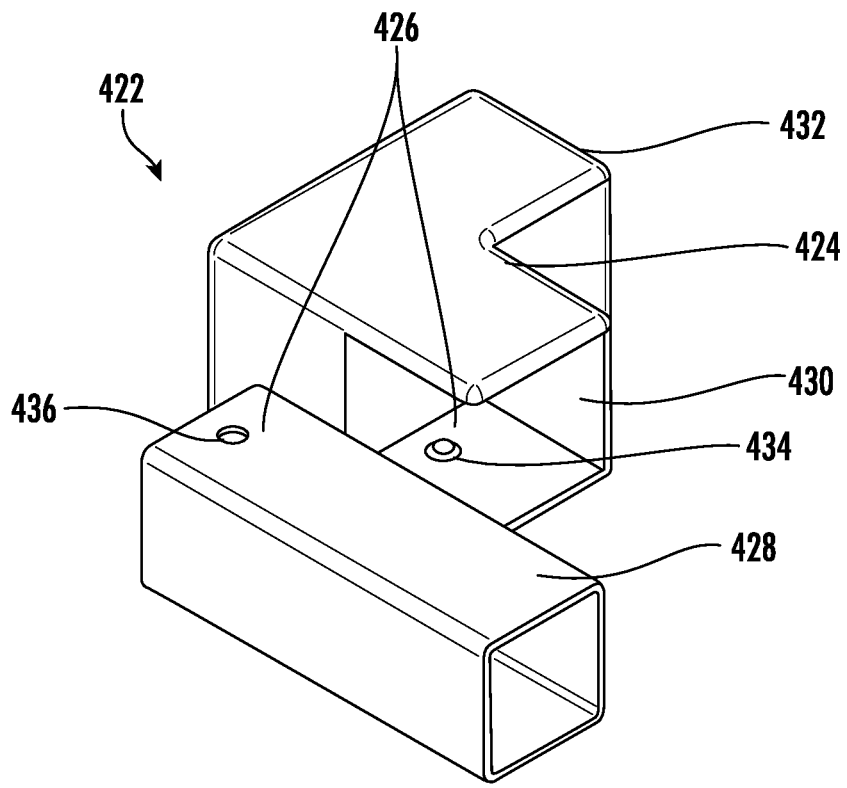
FIG. 15 shows a fifteenth embodiment of the component connector.

In FIGS. 14 and 15 there is illustrated embodiments of a component connector 402, 422 having a locking mechanism 406, 426 which mechanically (FIG. 15) and/or magnetically (FIG. 14) fastens components 408, 428 to one or both ends 410, 412 of a connector body 404, 424.

In FIGS. 14 and 15, there is a connector body 404, 424 which has a first end 410, 430 for receiving a portion of a first component 408, 438 and a second end 412, 432 for receiving a portion of a second component.

When components 408, 418 are not engaged by the locking mechanism 406, 426, the component/s 408, 418 received by the connector body 404, 424 has/have at least two degrees of freedom. Specifically, the component/s 408, 418 is/are substantially unrestricted from moving relative to the component connector 402, 422 in at least two directions when not engaged by the locking mechanism 406, 426.

In FIG. 14, the locking mechanism 406 is a magnetic mechanism. Specifically, a magnetic strip 416 is located along one of or multiple inner walls 414 of a first end 410 of the connector body. A component 408 made of a magnetic material locks into the connector body 404 once in close proximity to the magnetic strip 416 due to the magnetic force exerted by the strip 416. Removal of the component 408 is achieved by applying sufficient force to overcome the magnetic force locking the component/s 408 in place.

In FIG. 15, the locking mechanism 426 is mechanical. The connector body has protruding nodes 434 (of which only one is shown in FIG. 15). The nodes 434 engage with receiving holes 436 (of which only one is shown in FIG. 15) in the receiving portions of the components 428 when in the locked position. When transitioning from an unlocked to a locked position, the connector body 424 and/or the component 428 slightly flex. Once the nodes 434 and the holes 436 align, the nodes 434 penetrate the holes 428 and both the connector body 424 and the component substantially revert to their original form.

The component connectors 402, 422 of FIGS. 14 and 15 allow for the connection of at least two components 408, 428 in an assembly without having to subject the components 408, 428 or the connector 402, 422 to any undue stress or flex. This significantly reduces, and potentially eliminates, the risk of damaging assembly components as it drastically reduces the amount of flex the connector 402, 422 and the components 408, 428 are subjected to. As both connectors 402, 422 contain openings, the components 408, 428 have two degrees of freedom into which they can be received by the connector. By simply moving the components 408, 428 into the connector body 404, 424, the locking mechanism 406, 426 is activated. This allows for an easier and expedited frame assembly process.

The component connectors 2, 32, 60, 102, 132, 172, 202, 222, 242, 262, 292, 342, 364, 402, 422 shown in FIGS. 1 to 15 can be used in a method of connecting components, particularly in the construction of a frame, and more particularly in the construction of a bed frame such as for a pet bed. The method includes, moving the locking member 6, 36, 64, 106, 136, 176, 206, 226, 246, 266, 296, 346, 368 into the unlocked position; or placing the locking mechanism, 406, 426 in the unlock position/configuration. A portion of a first component is inserted into a connector first end 8, 48, 74, 108, 138; 208, 245, 265, 306, 348, 410, 430, and then inserting another component into a connector second end 10, 50, 76, 110, 140, 158, 210, 247, 267, 308, 350, 412, 432. The locking member 6, 36, 64, 106, 136, 176, 206, 226, 246, 266, 296, 346, 368 or mechanism 406, 426 is then moved into a locked position. This limits the degree of freedom of the components held within the connector.

Figure 16:
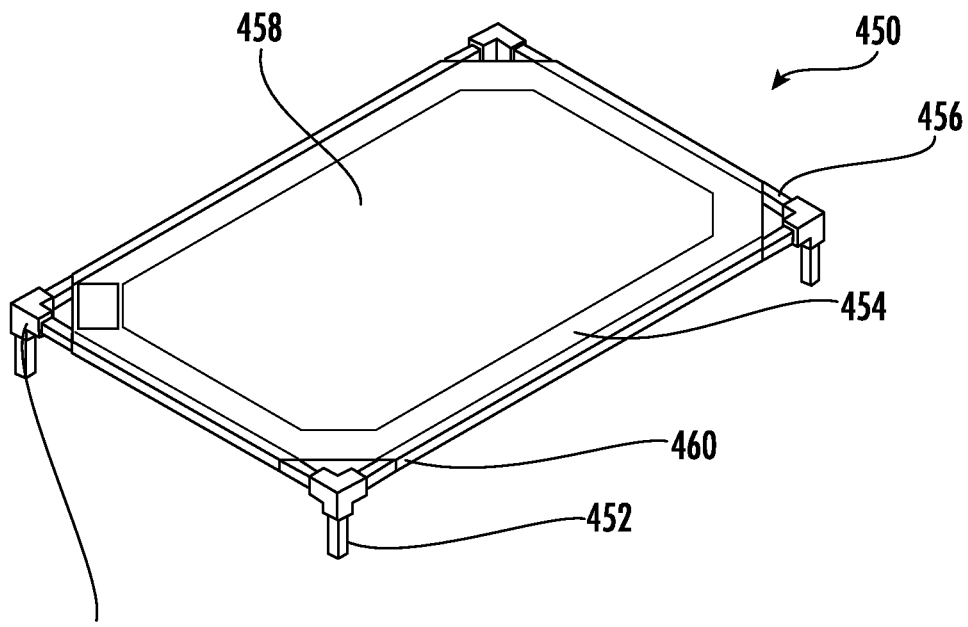
FIG. 16 shows an embodiment of a pet bed.

The invention also relates to a pet bed 450, as shown in FIG. 16, and a method of assembling a pet bed comprising component any one or a combination of connectors 2, 32, 60, 102, 132, 172, 202, 222, 242, 262, 292, 342, 364, 402, 422 as described in FIGS. 1 to 15. The Pet bed 450 shown in FIG. 16 is completely assembled. It has legs 452, and a body 454. The body 454 shown in is comprised of a resilient fabric 458, held under tension by frame components 456. The resilient fabric 458 has sleeves 460 through which frame components 456 are passed and are ultimately enclosed in. The use of traditional connectors during the assembly of the pet bed 450 can be quite troublesome due to the restricted movement provided by the resilient fabric 458. The component connectors 2, 32, 60, 102, 132, 172, 202, 222, 242, 262, 292, 342, 364, 402, 422 of FIGS. 1 to 15 allow for the frame components 456 to be connected in an easier manner as they provide degrees of freedom not available in conventional connectors.

The resilient fabric 458 in combination with the frame components 456, the legs 452 and the connectors 2, 32, 60, 102, 132, 172, 202, 222, 242, 262, 292, 342, 364, 402, 422 is designed to withstand the mass of a pet or an alternative being or object. The fabric 458, legs 452, and frame components 456 can be made of any suitable material for supporting the mass of a pet, a human, or a desired object.

In the embodiments 2, 32, 60, 102, 132, 172, 202, 222, 242, 262, 292, 342, 364, 402, 422 of FIGS. 1 to 15, there is shown or described two connector body ends (first end: first end 8, 48, 74, 108, 138; 208, 245, 265, 306, 348, 410, 430; and second end 10, 50, 76, 110, 140, 158, 210, 247, 267, 308, 350, 412, 432) for receiving components. Although not shown in the drawings, it is to be appreciated that more than two body ends for receiving components. Embodiments may comprise three, four five, or as many ends as are required.

Finally, it is to be understood that various alterations, modifications and/or additions may be introduced into the construction and arrangement of the parts previously described without departing from the spirit or ambit of this invention.

LIST OF REFERENCE NUMERALS

FIG. 1
Component Connector —2
Component Connector Body —4
Locking Member —6
Connector Body first end —8
Connector Body Second end —10
First Component —12
First end—Top wall aperture (FIG. 1)—14
Wall Recess/stop (FIG. 1)—16
Locking member gripping tab —18
First end—side wall —20

FIGS. 2(A)-2(C)
Component connector 32
Connector body —34
Locking Member —36
Protruding Stop —37
First side wall —38
Second side wall 40
Top wall opening —42
Bottom wall —44
Top section wall guides —46
Component body first end —48
Component body second end —50
Locking member side protrusions—52
Movement tab —54
Alternative configuration —56

FIG. 3
Component connector —60
Connector body —62
Locking Member —64
First side wall (opening)—66
Second side wall —68
Top wall —70
Bottom wall —72
Component body first end —74
Component body second end —76
Locking member tabs —78
Connector outer wall Recesses —80
Locking member arm —82
Locking member arm —84
Top Wall locking member receiving section —86
Bottom wall locking member receiving section —88
Outer edges —90, 92

FIG. 4
Component Connector 102
Component Connector Body —104
Locking Member —106
Connector Body first end —108
Connector Body Second end —110
First Component —112
Locking Member Protruding Section 122
Connector Body aperture —124
Locking mechanism stopes —126

FIG. 5
Component Connector 132
Component Connector Body —134
Locking Member —136
Connector Body first end —138
Connector Body Second end —140
First Component —142
Connector body recess—first side wall—146
Connector Body first Side wall —148
Connector Body first side bottom wall —150
Connector Body first side top wall —152
Connector Body Recess edges —154
Locking member first side —156
Locking members second side —158
Locking member top side —160
Locking member bottom side —162
Locking member—first side elongated section 164

FIG. 6
Component Connector 172
Connector body 174
Locking member 176
First Side top Surface opening 178
Second side top surface opening 180
Connector Body Top Surface 182

Locking Member Legs —184
Connector Body Recess —186
Locking Member Leg-Lips —188
Connector Body Aperture —190
FIG. 7
Component Connector —202
Connector body —204
Locking member —206
Open first end —208
Open second end —210
Connector body opening —212
Connector Body Internal stop 214
Connector Body Internal Surface —216
Connector Body Outer Surface —218
FIGS. 8(A) and 8(B)
Component Connector 222
Connector body 224
Locking member 226
Locking member first part 227
Locking member second part 228
Locking member Attachment arm 229
Pivot attachment point —230
Connector body first end 232
Recessed Grooves 234
Locking member lever 236
Component 237
Locked position 238
Unlocked position 239
FIG. 9
Component Connector 242
Connector Body —244
Connector body first end 245
Locking member —246
Connector body Second end 247
Connector Body top surface —248
Connector Body Bottom surface/wall —250
Pivot connection —252
Opening —254
Stop —256
Wall recess —258
Connector Body Side Wall —259
FIG. 10
Component Connector 262
Connector Body —264
Connector body first end —265
Locking member —266
Connector body Second end 267
Top Surface —268
Bottom surface/wall —270
Pivot Connection —272
Connector Body Side Wall —274
Stop —276
Wall Recess —278
FIG. 11
Component Connector 292
Connector Body —294
Locking member —296
Connector Body Top Surface —298
Connector Body Bottom Surface —300
First Connection point —302
First end —306
Second end —308
Outer side wall—first end —310
Opening—312
Stop —314
Recessed Wall sections —316
Locking member protruding Section —318
Recessed groove —320
Connector Body Internal Surface —322
FIG. 12
Component Connector —342
Connector Body —344
Locking member —346
First end —348
Second end —350
Aperture —352
Component portion —354
Outer External Surface —356
Outer Internal Surface —358
FIG. 13
Connector —364
Connector Body —366
Locking Member —368
FIG. 14
Connector —402
Connector Body 404
Locking Mechanism 406
Component —408
Connector Body First End 410
Connector Body Second End 412
First end inner walls —414
Magnetic Strip —416
FIG. 15
Connector —422
Connector Body —424
Locking Mechanism —426
Component —428
Connector Body First End 430
Connector Body Second End 432
Connector Body Nodes —434
Component Holes —436
FIG. 16
Pet Bed —450
Legs —452
Body —454
Frame components —456
Resilient Fabric —458

What is claimed is:

1. A component connector comprising:
a connector body having a first end for receiving a portion of a first component and a second end for receiving a portion of a second component; and
a locking member moveable relative to the connector body between a locked position and an unlocked position,
wherein, in the locked position, the locking member engages with the connector body and restricts movement of the portion of the first component relative to the connector body, and
wherein, in the unlocked position, the locking member at least partially disengages with the connector body, thereby allowing relative movement between the connector body and the portion of the first component,
wherein the connector body defines a first opening at the first end that is open in a first direction,
wherein the connector body comprises a second opening that is open in a second direction perpendicular to the first direction,
wherein, in the unlocked position, the second opening allows the portion of the first component to pass therethrough into an internal space of the connector body, and
wherein, in the locked position, the locking member moves to a position that covers the third opening such that the portion of the first component within the connector body is restricted from moving along the second direction.

2. The component connector according to claim 1, wherein the locking member moves between the locked position and the unlocked position by sliding along and/or across a section or sections of the connector body.

3. The component connector according to claim 1, wherein the locking member moves between the locked position and the unlocked position by rotating about a section or sections of the connector body.

4. The component connector according to claim 1, wherein the locking member moves between the locked position and the unlocked position by pivoting about an axis running along and/or across the connector body, or hingedly moves about a hinged connection between the locking member and the connector body.

5. The component connector according to claim 1, wherein movement of the locking member beyond the locked position, relative to the connector body, is limited by a stop.

6. The component connector according to claim 5, wherein the stop is integral or attached to the locking member.

7. The component connector according to claim 6, wherein the locking member comprises a stopping tab.

8. The component connector according to claim 5, wherein the stop is integral with or attached to the connector body.

9. The component connector according to claim 8, wherein the stop is a recessed section of the connector body which receives a portion of the locking member and limits the movement of the locking member.

10. The component connector according to claim 9, wherein the locking member comprises a corresponding protruding section which is received in the recessed portion of the connector body.

11. The component connector according to claim 1, wherein the locking member remains attached to the connector body when in the unlocked position.

12. The component connector according to claim 1, wherein the locking member is completely detached from the connector body when in the unlocked position.

13. The component connector according to claim 1, wherein the locking member is mechanically fastened to the connector body when in the locked position.

14. The component connector according to claim 13, wherein the locking member comprises at least one resilient snap-fit member which engages with a snap-fit receiving section in the connector body when in the locked position.

15. The component connector according to claim 13, wherein the locking member and the connector body comprise a complimentary threaded arrangement, wherein rotation of the locking member is guided by the threaded arrangement.

16. The component connector according to claim 1, wherein when the locking member is in the locked position, the portion of the first component received by the connector body is substantially restricted from moving relative to the component connector in all but the first direction.

17. The component connector according to claim 1, wherein when the locking member is in the unlocked position, the portion of the first component received by the connector body is substantially unrestricted from moving relative to the component connector in at least the first and second directions.

18. The component connector according to claim 1, wherein the component connector comprises a third end for receiving a third portion of a third component.

19. A method of connecting components using the component connector of claim 1, comprising:
    moving the locking member into the unlocked position;
    inserting the portion of the first component into the first end of the connector body;
    inserting the portion of the second component into the second end of the component connector; and
    moving the locking member into the locked position.

* * * * *